(12) United States Patent
Sadovsky et al.

(10) Patent No.: US 7,853,759 B2
(45) Date of Patent: Dec. 14, 2010

(54) HINTS MODEL FOR OPTIMIZATION OF STORAGE DEVICES CONNECTED TO HOST AND WRITE OPTIMIZATION SCHEMA FOR STORAGE DEVICES

(75) Inventors: Vladimir Sadovsky, Redmond, WA (US); Robin Alexander, Redmond, WA (US); Frank Shu, Bellevue, WA (US); Nathan Obr, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 11/856,167

(22) Filed: Sep. 17, 2007

(65) Prior Publication Data

US 2008/0263259 A1 Oct. 23, 2008

Related U.S. Application Data

(60) Provisional application No. 60/913,500, filed on Apr. 23, 2007.

(51) Int. Cl.
  *G06F 12/00* (2006.01)
(52) U.S. Cl. .................................................... 711/154
(58) Field of Classification Search ........................ None
  See application file for complete search history.

(56) References Cited

U.S. PATENT DOCUMENTS

| | | | | |
|---|---|---|---|---|
| 5,860,083 | A * | 1/1999 | Sukegawa | 711/103 |
| 6,085,193 | A | 7/2000 | Malkin et al. | |
| 6,330,621 | B1 * | 12/2001 | Bakke et al. | 710/5 |
| 6,745,295 | B2 * | 6/2004 | Rodriguez | 711/136 |
| 6,898,664 | B2 | 5/2005 | Matthews et al. | |
| 6,915,376 | B1 | 7/2005 | Coulson et al. | |
| 6,957,433 | B2 | 10/2005 | Umberger et al. | |
| 7,130,967 | B2 | 10/2006 | Arimilli | |
| 7,260,699 | B2 * | 8/2007 | Nakagawa et al. | 711/170 |
| 2002/0154633 | A1 | 10/2002 | Shin et al. | |
| 2004/0107319 | A1 * | 6/2004 | D'Orto et al. | 711/133 |

(Continued)

FOREIGN PATENT DOCUMENTS

| WO | WO9954833 A2 | 10/1999 |
|---|---|---|
| WO | 2004090754 A1 | 10/2004 |

OTHER PUBLICATIONS

Ganger, "Blurring the Line between OSes and Storage Devices", Carnegie Mellon University, Dec. 2001, pp. 1-17.

(Continued)

*Primary Examiner*—Hiep T Nguyen

(57) ABSTRACT

Architecture for data communications optimization based on generating and communicating "intents" or "hints" to a storage device and faster/slower solid state memory optimization. Data destined for storage on the storage device (capable of hints processing) can be bracketed to take advantage of improved performance associated with the hints processing. Data can be communicated in block format such that individual series of block exchanges can occur. Hints processing can be optional at the storage device. When communicated to the storage device firmware facilitates optimization of internal data flow and device operation. A write optimization schema is provided for storage system such as solid state storage devices. For example, frequently-modified data can be stored in faster memory to provide more efficient overall application data processing, and less-frequently modified data can be processed into and out of lower cost (or slower) memory.

20 Claims, 14 Drawing Sheets

U.S. PATENT DOCUMENTS

| | | | |
|---|---|---|---|
| 2004/0243699 A1* | 12/2004 | Koclanes et al. | 709/224 |
| 2004/0250043 A1 | 12/2004 | Ripberger et al. | |
| 2005/0149562 A1* | 7/2005 | Browne et al. | 707/104.1 |
| 2005/0251547 A1 | 11/2005 | Bello et al. | |
| 2006/0022054 A1 | 2/2006 | Elhamias et al. | |
| 2006/0112251 A1 | 5/2006 | Karr et al. | |
| 2007/0050684 A1 | 3/2007 | Takaoka et al. | |
| 2007/0156998 A1* | 7/2007 | Gorobets | 711/170 |
| 2008/0141321 A1* | 6/2008 | Kubat et al. | 725/110 |

OTHER PUBLICATIONS

Ganger, et al, "Expressive Storage Interfaces", retrieved on Mar. 23, 2007, at <<http://www.pdl.cmu.edu/ESI/overview.html>>, 2001, pp. 1-3.

Won, et al., "Intelligent Storage: Cross-Layer Optimization for Soft Real-Time Workload" ACM Press, vol. 2, Issue 3, Aug. 2006, pp. 255-282.

International Search Report, mailed Aug. 29, 2008, 10 pages.

* cited by examiner

HINTS MODEL FOR OPTIMIZATION OF STORAGE DEVICES CONNECTED TO HOST AND WRITE OPTIMIZATION SCHEMA FOR STORAGE DEVICES

CROSS-REFERENCE TO RELATED APPLICATIONS

This application claims the benefit of U.S. Provisional Patent application Ser. No. 60/913,500 entitled "HINTS MODEL FOR OPTIMIZATION OF STORAGE DEVICES CONNECTED TO HOST AND WRITE OPTIMIZATION SCHEMA FOR STORAGE DEVICES" and filed Apr. 23, 2007, the entirety of which is incorporated by reference herein.

BACKGROUND

The capacities and internal speeds of operation of mass storage devices are growing exponentially making such storage devices more complex. Accordingly, manufacturers are including powerful embedded microprocessors on these devices. Moreover, with the faster speeds at which data can and needs to be handled in the application layers read/write access to storage devices can become a bottleneck in the communications pipeline thereby affecting user experience and overall machine operations.

A traditional model for operating such devices continues to be a file system running on a host machine that communicates with the storage device using block-oriented device protocols. With capable processor firmware the storage device can optimize internal operations depending on the exact intent the host software has when initiating a high-level logical operation. However, the only conventional protocol available to firmware is the block protocol, which presents a significant impediment to providing an ability to adapt and optimize data and device operations. Consequently, firmware designers are resorting to techniques such as snooping into packets coming from the host and trying guess the intent of higher level OS software data management. This approach is fragile and suboptimal. Moreover, the rapid improvements and associated reduction in costs associated with solid state drives (SSDs) is forcing designers to take a new look at ways in which to optimize data flow in host systems.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a communication method based on higher level operating system (OS) layers capable for data communications optimization based on generating and communicating "intents" or "hints" to a storage device. Data destined for storage on the storage device (capable of hints processing) can then be bracketed (or tagged) to take advantage of improved performance associated with the hints processing. Data can be communicated in block format, for example, such that individual series of block exchanges can occur. Hints processing can be optional at the storage device. When determined that the capability exists in the device, information communicated to the storage device firmware facilitates optimization of internal data flow and device operation.

The architecture provides a workflow model where a device and OS communicate (e.g., based on storage device firmware reporting ability) to detect hints processing capability. The hints model includes language that is extensible and which can be layered over block communications. Additionally, based on the extensibility, custom parts of a host stack can initiate hints communication to the storage device (e.g., the firmware) for proprietary transactions.

The architecture also includes a write optimization schema for storage systems such as solid state storage devices. For example, where multiple types of data storage are available (e.g., single-layer cell (SLC) flash memory, multi-layer cell (MLC) flash memory), and the frequently-modified data can be stored in faster memory to provide more efficient overall application data processing, at least with respect to file system data storage. Similarly, where data is read-only or less-frequently modified, such data can be processed into and out of lower cost (or slower) memory. This selectivity provides a more optimum use of resources as well as component costs. Where solid state devices mass storage technology is concerned, the difference in memory costs can be significant advantage in sales and market share in an area that is sure to be very competitive in the consumer market.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
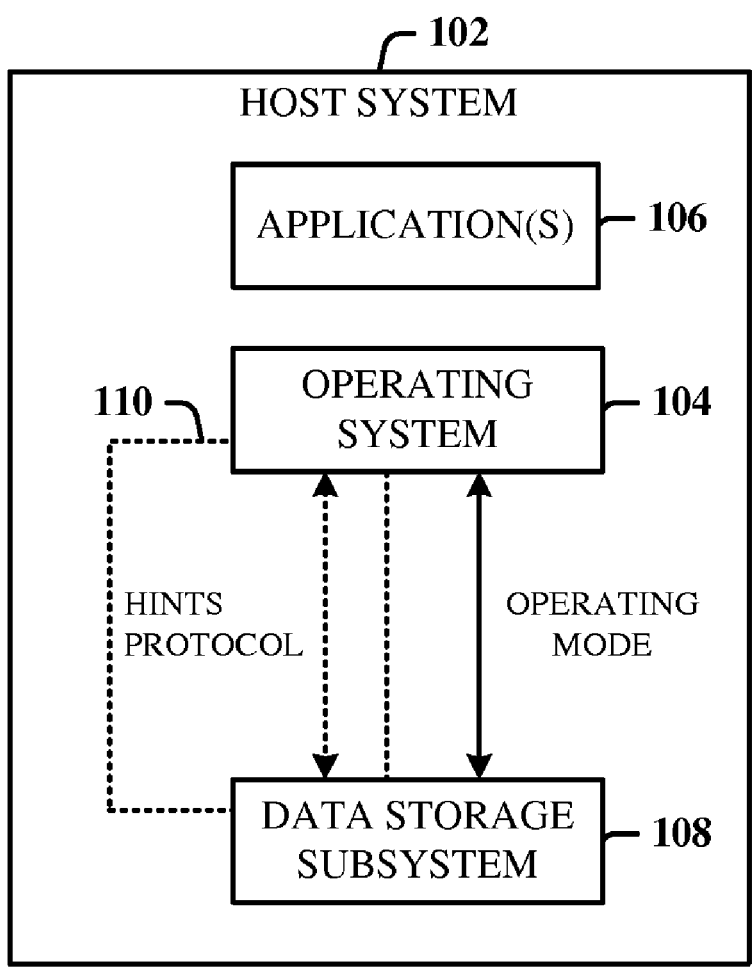
FIG. 1 illustrates a system for generating and communicating hints information for optimized data storage operations.

The disclosed architecture includes a communication method based on higher level application layers (e.g., an operating system (OS)) communicating "intents" or "hints" to storage devices capable of processing such hints data. The hints data can then be bracketed or tagged numerically, for example, with hints identifiers to take advantage of improved hints performance processing between the storage device and the hints application.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a system 100 for generating and communicating hints information for optimized data storage operations. A host system 102 runs an operating system (OS) 104 for host system processes including high-level applications 106 at an application layer. The OS 104 interfaces to a data storage subsystem 108 (e.g., mechanical drives, solid state drives, etc.) for storing data (e.g., blocks). The OS 104 and subsystem 108 interface to a hints component 110 that facilitates a formal communications pipe between the OS 104 and the subsystem 108 using a hints protocol. If the subsystem 108 is hints-capable, this functionality can be communicated to the OS 104 upon system startup and/or subsystem startup, for example. Consequently, data operations between the OS 104 and the subsystem 108 can be significantly improved.

The hints protocol can be considered a sideline formal communications method that can be utilized by on higher level layers (e.g., OS, application) for communicating "intents" or hints to the storage subsystem 108 (e.g., subsystem firmware). In one implementation, the hints protocol encapsulates (or brackets) individual sets of block exchanges of data blocks.

For example, if a flash-based device (e.g., a solid state drive (SSD)) receives a series of block writes, implementing directory removal can greatly optimize internal flash page movements thereby avoiding read/write cycles (depending on a particular controller technology). Similarly, if a hints-capable digital camera indicates to storage-related hints-capable firmware that the camera is capable of continuously streaming bits (that represent digital images or video clips), then the firmware can direct upcoming data flow to storage sectors more efficiently. Another example includes streaming data from a flash device, where in addition to the host system 102 being optimized with data buffering, the storage-related hints-capable firmware can utilize controller commands for more optimal data delivery and storage.

Figure 2:
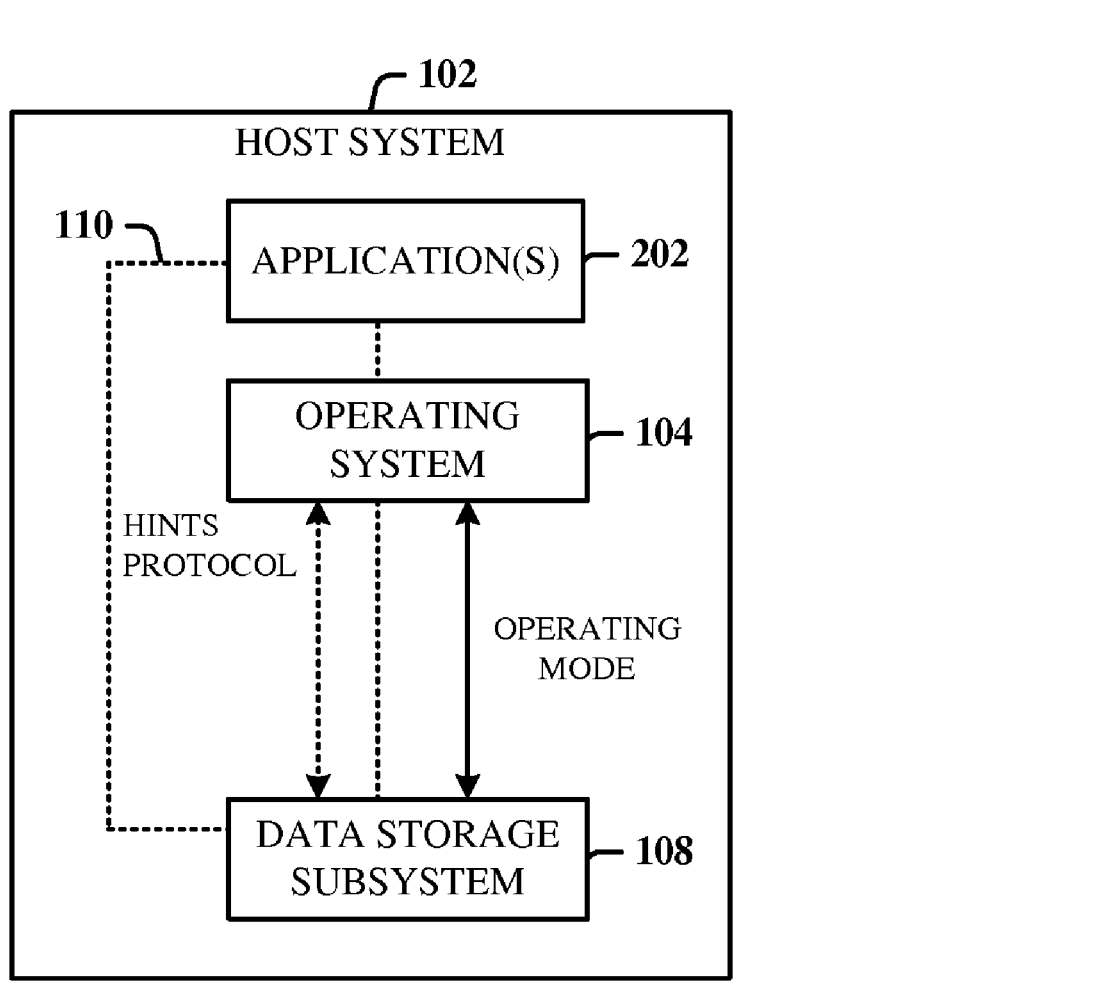
FIG. 2 illustrates a system that represents the extensibility of the hints model.

FIG. 2 illustrates a system 200 that represents the extensibility of the hints model. Here, the hints components 110 extends into the application layer such that a hints-capable application 202 can send hints data blocks via the hints protocol to the OS 104. The OS 104 then processes the hints data blocks for forwarding to the subsystem 108 for optimal data handling and processing between the application 202, OS 104 and subsystem 108. Where multiple hints-capable applications 202 are sending hints data blocks, the OS 104 can filter out duplicate block processing and/or prioritize hints data and information forwarded to the subsystem 108.

The hints model is based on the storage subsystem firmware reporting the capability to understand the hints protocol. The hints protocol (or language) is layered over block communications, and as exemplified, is extensible. Extensibility also includes custom parts of the host stack initiating hints communication to the firmware for proprietary transactions.

In an alternative implementation, the application(s) 202 (and/or OS 104) and the firmware (not shown here, but shown in FIG. 4) of the data storage subsystem 108 interact early in the capability negotiation phase (e.g., during installation of the subsystem 108) to address hints compatibility of the application(s) 202 with the hints capability of the application(s) 202. Thus, it is possible that the application(s) 202 can include "extended" hints capability over the "basic" hints capability of the subsystem 108. In this case, the user can run the system 102 according to the basic compatibility or install into storage subsystem firmware the extended capability such that now the application(s) and the subsystem 108 can operate in full compatibility according to the extended hints protocol. The extended hints capability of the application(s) 202 can be implemented in the form of a custom module that the user installs on the system 102, for example. The compatibility negotiation process can utilize a matching algorithm that matches a common identifier of the hardware to a library of compatible storage subsystem identifiers in applications(s) or custom modules. Operation is then based on the success or failure of the matching process.

Utilization of the hints protocol can be optional. However, when the layers and the storage subsystem(s) are deemed capable of hints communications, internal data flow and device operation is optimized.

Figure 3:
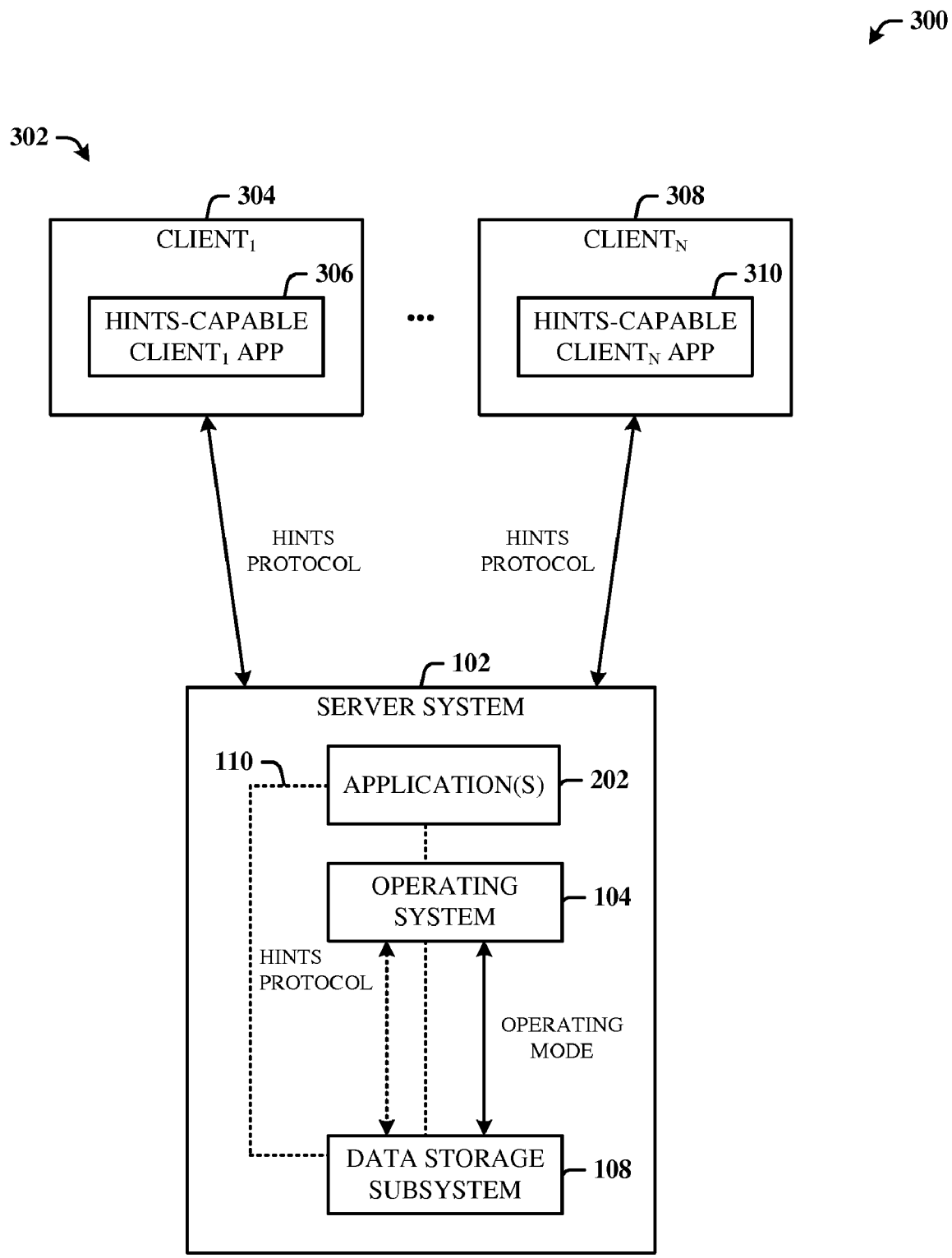
FIG. 3 illustrates a system that further represents the extensibility of the disclosed hints model.

FIG. 3 illustrates a system 300 that further represents the extensibility of the disclosed hints model. Here, a client/server environment include clients 302 (denoted $CLIENT_1, \ldots, CLIENT_N$) having corresponding hints-capable client applications. A first client 304 includes a first hints-capable application 306 and an Nth client 308 includes a respective hints-capable application 310. The clients 302 can be reading/writing in accordance with services requested of the host system 102 (now referred to as the server system 102). In that the server data storage subsystem 108 report hints-capable functionality to the server OS 104, the OS 104 can also report to the clients 302 that the server is hints-capable. Accordingly, the client apps (306 and 310) can perform data block communications to the server 102 according to the hints protocol.

As previously indicated the OS 104 can then filter and/or prioritize hints communications from the clients 302 and/or server applications 202 for block communications to the server subsystem 108. Where one of the clients is not hints-capable, block transactions to the subsystem 108 for that client will be according to conventional block communications technologies.

In another embodiment, when a storage device is being initialized, the device firmware reports the capability to interpret hints language of a certain version. For example, since the protocol is extensible, different hints protocol versions can be employed. Accordingly, the hints component 110 can accommodate the different protocol versions that may be embodied in the storage device firmware, as well as facilitate updates to the firmware where possible.

In an alternative implementation, the application(s) 202 (and/or OS 104) and the firmware (not shown here, but shown in FIG. 4) of the data storage subsystem 108 interact early in the capability negotiation phase (e.g., during installation of the subsystem 108) to address hints version compatibility of the application(s) 202 with the hints version capability of the application(s) 202. Thus, it is possible that the application(s) 202 can include "extended" hints capability in a later version of the protocol over the "basic" hints capability of the subsystem 108 in an earlier protocol version.

In this case, the user can run the system 102 according to the basic version compatibility or install into storage subsystem firmware the updated version for extended capability such that now the application(s) and the subsystem 108 can operate in full compatibility according to the same version of the extended hints protocol. The compatibility negotiation process can utilize a matching algorithm that matches the hints protocol versions between the hardware and the applications(s). Operation is then based the capability resulting from the intersection of the protocol versions.

Hints operation can be made optional, in that it is not a requirement to use the hints model, although available. In one implementation, when the hints protocol is initiated for block processing by the source application (e.g., the OS or other applications) the data sequence will be closed by the host OS. In an alternative embodiment, the sequence is closed by the source application of the host.

The hints protocol language can represent an open grammar with hints identified by the numeric code. Moreover, storage subsystem firmware does not need to reply to hints information, although the subsystem may reject the hints data if the data is not valid.

Figure 4:
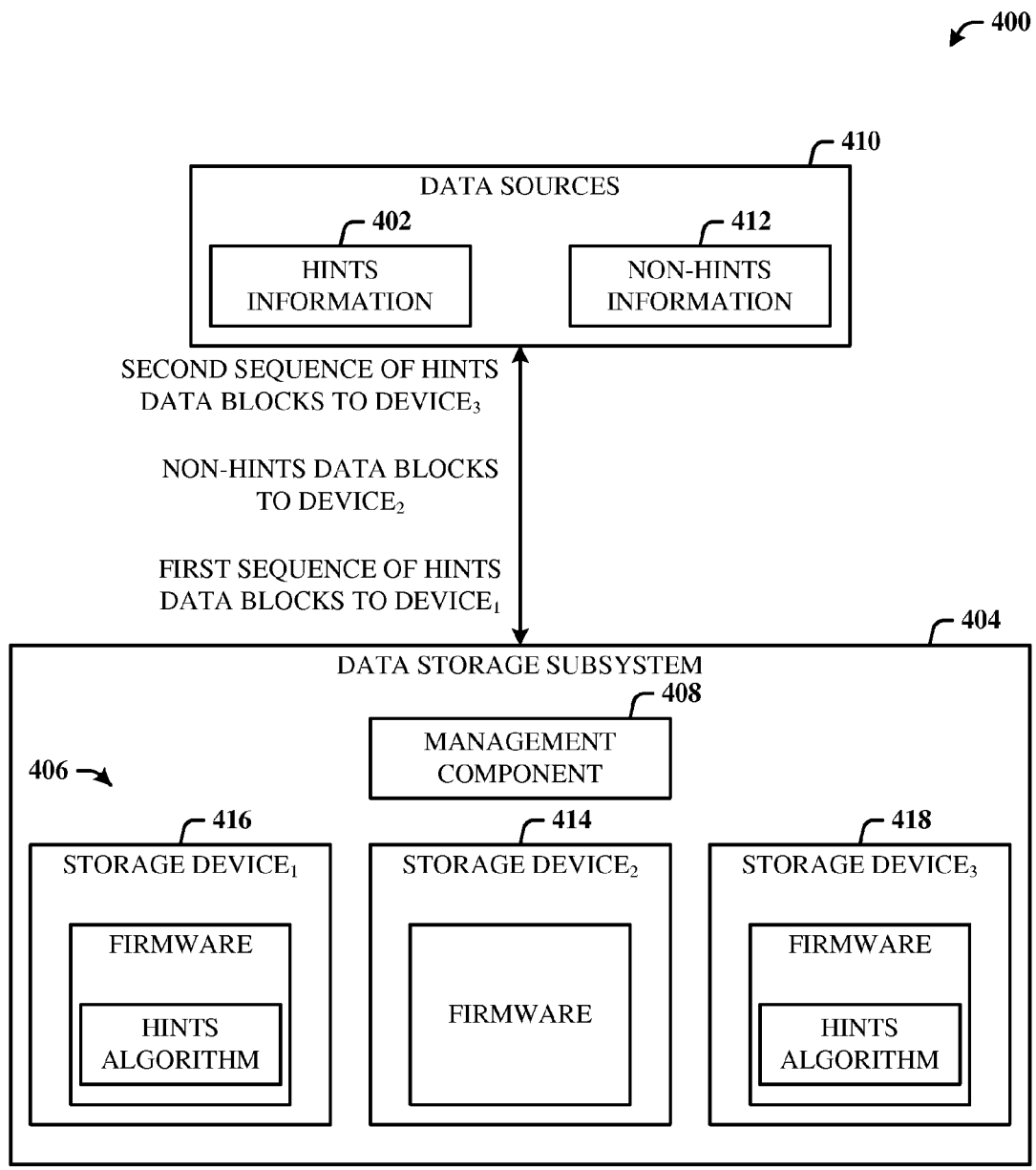
FIG. 4 illustrates a system where hints information is sent to a storage subsystem having storage devices with different hints capability.

FIG. 4 illustrates a system 400 where hints information 402 is sent to a storage subsystem 404 having storage devices 406 with different hints capability. In support of computing systems (e.g., personal computers, servers) that typically employ multiple storage devices, the storage subsystem 404 can include a storage management component 408 that manages the routing of the data from data sources 410 that can provide the hints information 402 to the appropriate hints-capable storage device and/or non-hints information 412 to a legacy storage device 414. When the devices 406 initialize, hints capability of the devices 406 is reported to the host OS via a hints algorithm in the device firmware. Thereafter, the hints information 402 (e.g., tagged data blocks) can be routed appropriately.

For example, a first sequence of hints data blocks is received by the management component 408, processed, and routed to a first hints-capable storage device 416. A set of non-hints data blocks is received by the management component 408 and can be routed to any one or more of the devices 406, since hints-capable devices can also store non-hints data blocks. A second sequence of hints data blocks is then received from the data sources 410, which when received by the management component 408 can be routed to either the first hints-capable device 416 or a second hints-capable device 418.

The management component 408 can be suitably designed to remember where data blocks have been routed for storage. Alternatively, in addition thereto, the management component 408 can pass storage information up to the data sources 410 such that the hints data blocks are tagged with storage location information for routing subsequent blocks of same or similar data. Still alternatively, the data sources 410 can access management information in the management component 408 to determine where to send hints data blocks. For example, if the first hints-capable device 416 cannot accommodate the second sequence of hints data blocks for contiguous storage, the management component 408 can route the second sequence to the second hints-capable storage device 418 using the hints protocol for optimum block handling and storage.

Hints information can include hardware capability related to block data operations for more efficient handling and storage, the type of storage device, type of memory on the storage device for utilization, software version, and so on. Moreover, this can include the bandwidth capabilities of communications between the host and the storage device, which can be utilized to determine data handling between these entities. For example, a larger bus (e.g., bits wide) can indicate that larger data blocks can be utilized. Likewise, if the data path is narrower, this can also indicate alternative data handling operations that can be invoked for optimum data handling and storage. The use of soft hints information further allows for adapting and/or updating hints processing with changes to hardware and software. Once received, the hints algorithm executing on the storage subsystem strips the hints information from the data and, processes and stores that data more efficiently.

Figure 5:
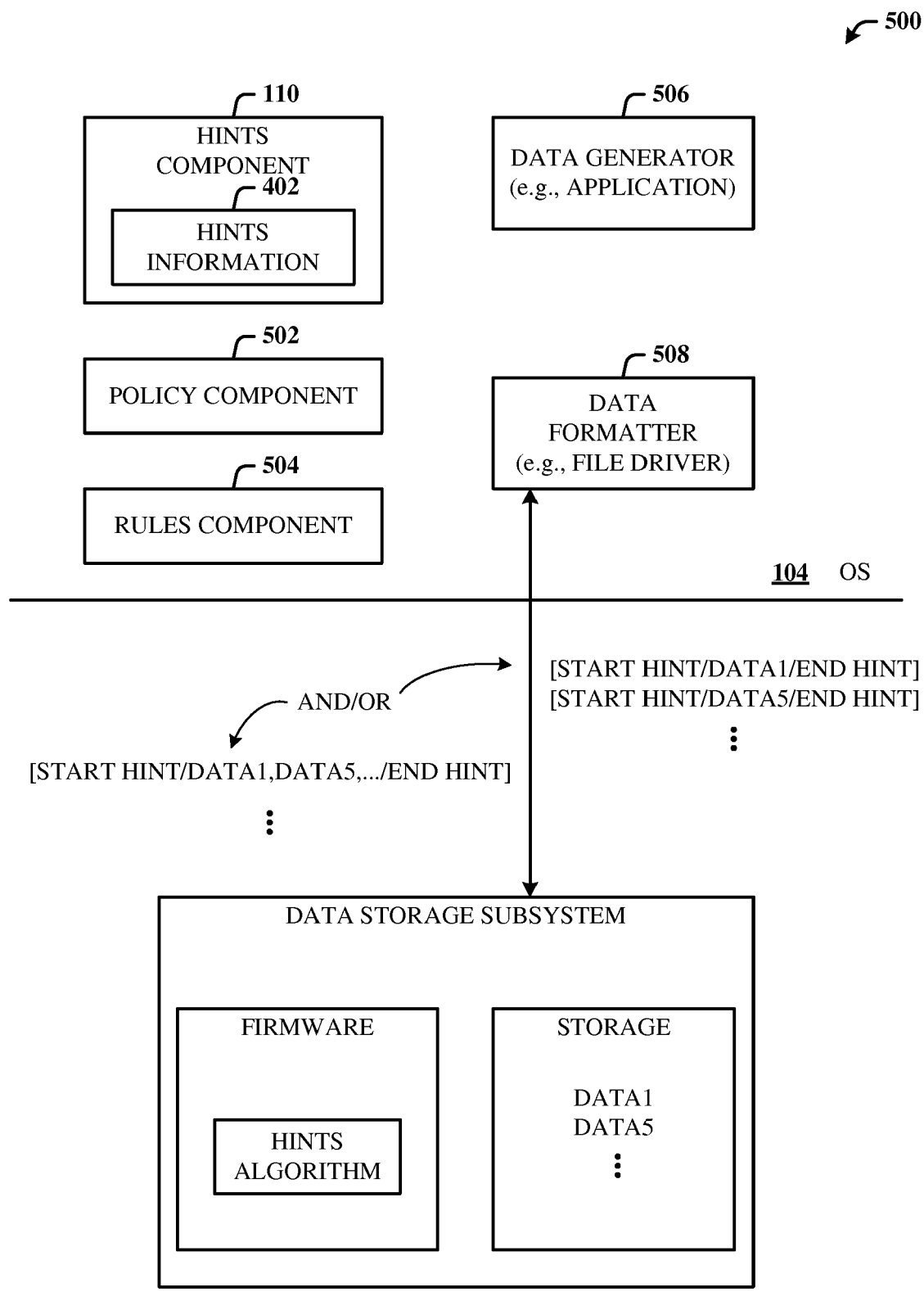
FIG. 5 illustrates a more detailed implementation of a host system for hints data processing.

FIG. 5 illustrates a more detailed implementation of a host system 500 for hints data processing. The host system 500 includes separately (e.g., as a plug-in) or as part of the OS, the hints component 110 that sends the hints information 402 via the OS 104, a policy component 502 for defining policy related to hints processing, and a rules component 504 for executing rules related to hints generation and processing. The host system 500 can also include data generators 506 such as applications, modules, etc., and a data formatter 508 (e.g., a file system driver, stack, etc.) for formatting the host data according to the hints protocol for communication and storage.

If given storage device is able to interpret hints, a file system driver (or custom filter driver layered over the file system) starts bracketing complex operations with "START HINT"/"END HINT" sequences. In one exemplary format, the hints data (e.g., DATA1, DATA2, . . . ) can be bracketed as blocks, for example, a DATA1 block, followed by a DATA2 block, and so on. It is also within contemplation that the disclosed architecture can process streaming data, wherein the streaming data can begin with a hints header (e.g., START HINT) and end with a hints trailer (e.g., END HINT). In yet another example, the data blocks are tagged with hints information rather than using header/trailer messages.

At the hints-capable storage device (e.g., an SSD), the device firmware includes the hints algorithm for receiving, stripping the hints header/trailer information, and storing the data (e.g., DATA1, DATA2, . . . ). In SSD drives, it is possible to include sets of solid state memory each operating at different speeds for more efficient utilization. Data storage can be according to more-frequently used data in faster memory, and less-frequently used data in slower memory, in the context of multi-type memory of an SSD subsystem, for example. Although less of an optimization, where rotating magnetic storage subsystems (e.g., hard disk drives) are employed, there is no availability of fast or slow memory. However, in one exemplary optimization relative to such mechanical magnetic storage systems, more-frequently used data could be stored in platter areas where access is faster (e.g., the outer perimeter areas) rather than the interior of the platter(s).

Figure 6:
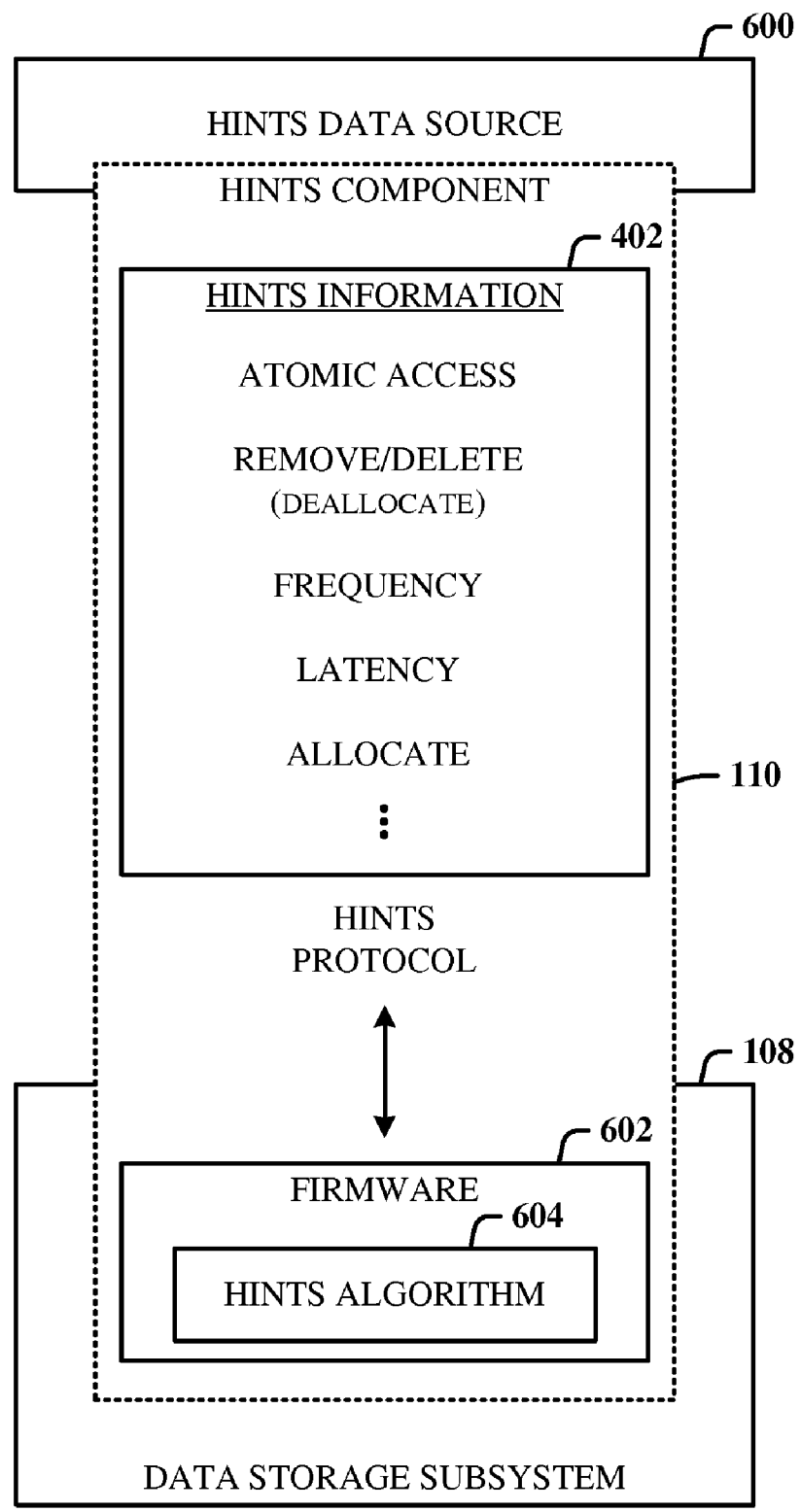
FIG. 6 illustrates a more detailed description of the hints information that can be employed.

FIG. 6 illustrates a more detailed description of the hints information 402 that can be employed. The hints component 110 provides a mechanism by which to give information from a hints data source 600 (e.g., the OS) to the storage subsystem 108 about how the data source 600 is going to use the data that the subsystem 108 is storing. Essentially, a low level contract can be said to be established between the data source 600 and the subsystem 108 that indicates to the subsystem 108 to perform data storage in a way that optimizes use by the data source 600. This is facilitated by the subsystem firmware 602 hosting a hints algorithm 604 (as part of the hints component 110).

In one example, the hints information 402 can include atomic access information for identifying sets of blocks that are associated with each other. This is similar, but not identical, to conventional defragmentation where blocks of data are stored proximate to (e.g., contiguous) other similar data blocks. Conventional defragmentation is completely dependent on the assumption that by reading all of the blocks together off of the storage medium and then writing the blocks back sequentially using LBA (logical block addressing) puts the blocks next to each other for faster access. However, on many devices this just is not the case.

Atomic access information in the hints protocol provides a range of blocks to the subsystem 108 indicating to the subsystem 108 that when accessing any of the blocks in the range information, the other associated blocks will also be accessed. An additional condition can be to request that the subsystem 108 ensure that access to all of the blocks in the range can be accessed with the least amount of effort. In other words, the disclosed hints model gives the storage subsystem 108 enough information to make intelligent decisions. If the subsystem 108 cannot use that information, it is only an opportunity loss; there is no data loss or data corruption. The devise continues to work properly. There can be instances when the subsystem 108 receives the information, yet cannot act on it due to its current state.

A goal is to provide a way in which the OS (or hints data source 600) can tell the storage device about how the OS works. This also provides extensibility in the hints component, protocol, and algorithm for adapting to changing circumstances without needing to do revisions, change core assumptions, or potentially, need to make a decision on whether or not storage should be optimized for the variety of conventional operating systems.

The hints information 402 can also deal with the removal and deletion of data. Conventionally, if the file system has deleted data, the data can still exist but the pointers to the data are erased. Where the data is retained on the storage medium, the storages devices can actually maintain the data based on not knowing that the data is useless. This atomic access facilitates telling the device that the deleted yet retained data is no longer important. Consequently, the device can decide to do something with that information. Essentially, this is a contract that indicates these blocks will be written to before being read again.

The hints information 402 can include frequency information. Once it is specified that sets of blocks will be accessed in certain way, the frequency of access can also be communicated in the hints information 402. The storage subsystem 108 (or device) can be signaled the host will access the blocks frequently or infrequently based on predetermined criteria. For example, if it is known when each time the system boots that within a certain amount of time the blocks will be accessed, then it can be inferred that the blocks are going to be accessed at least once per session. This can be in contrast to another set of blocks which could be a temporary file or a word processing document that has not been opened in months, which will be accessed infrequently. Another example is a page file which is constantly undergoing read/write processes, and thus, is accessed very frequently.

The hints information 402 can include latency information. Because data blocks can be read and written very frequently does not mean that the data is urgent. There can exist data that is read and written very infrequently, but that can be very urgent. Thus, urgency cannot be associated with frequency. For example, an executable program sitting on the disc and that the system is going to execute will be delayed. Moreover, because there may be a system process in front of the executable such that even if only used once a month, when the system process uses the executable, the process wants it immediately. This is in contrast to background processes such as logs that could be potentially frequent and not urgent.

The hints information 402 can include allocation and de-allocation information, which provides for caching information to the storage subsystem and then cleaning the cache when no longer needed. It will be known that a datasource is preparing to make a large number of impending block writes and that the sectors are known. The file system can provide information to the storage subsystem about the impending writes and the sectors so that the subsystem can prepare. Thus, based on predicted large scale writes coming ahead of time, the subsystem can be commanded to allocate space for handling the large amount of data and the sectors.

Figure 7:
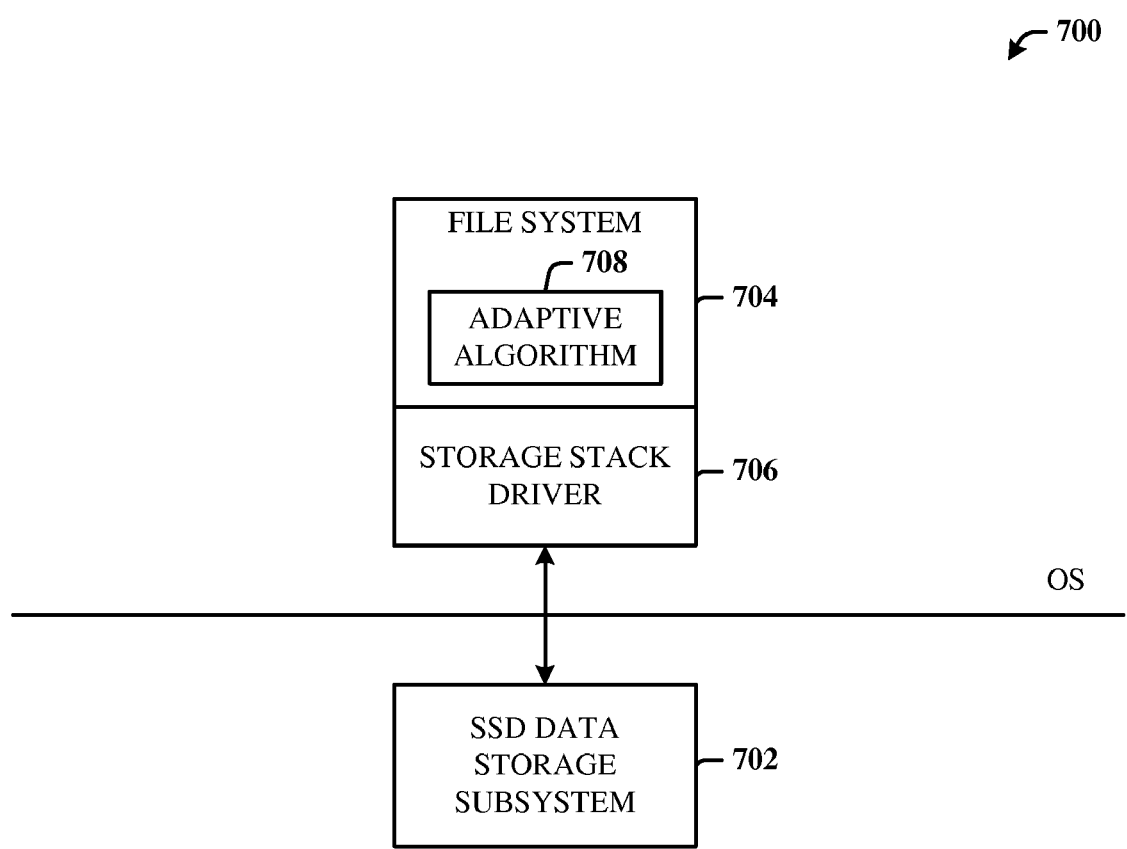
FIG. 7 illustrates a system that employs an SSD data storage subsystem for optimized data storage.

FIG. 7 illustrates a system 700 that employs an SSD data storage subsystem 702 for optimized data storage. The system 700 includes a file system 704 for preparing and communicating data for storage to the data subsystem 702 using a storage driver stack 706. Where the SSD subsystem 702 includes at least two types of memory (e.g., flash), faster memory and slower memory, this hardware characteristic can be leveraged for optimum data storage and processing.

The amount of frequently-modified system data during day-to-day use of a computer is nearly a constant for a given OS. In one example, the amount of this data can approximate 8 GB for a client machine. Accordingly, the file system 704 can be configured to identify frequently-modified data and store the frequently-modified data in a more optimized memory area for faster access. For example, where multiple types of data storage are available (e.g., single-layer cell (SLC) flash memory, multi-layer cell (MLC) flash memory), the frequently-modified data can be stored in faster memory to provide more efficient overall application data processing, at least with respect to file system data storage.

Similarly, where data which is read-only or less-frequently modified, such data can be processed into and out of lower cost (or slower) memory. This selectivity provides a more optimum use of resources as well as component costs. Where SSD mass storage technology is concerned, the difference in memory costs can be significant advantage in sales and market share in the consumer market.

In addition, the frequently-modified data exhibits characteristics such as a locality. In other words, files such as $log, $MFT and $Bitmap are some examples of data that tends to be more frequently used, and hence, is more suitable for faster memory storage. For example, in the context of SSD storage subsystems 702, in order to optimize SSD for write operations, the localized data files should be located in the optimized (or faster) memory area beginning with the installation of the OS. The file system 704 can then retrieve the data from the memory locations and manipulate the data as needed.

The file system 702 also uses the knowledge from the SSD device on the optimized memory address(es) and storage size, and is able to use the same policy to store the data in the right locations during the entire time of the operation.

Using a fixed file name to flag the frequently-modified data offers a simple means for identifying the data and requires less overhead. However, it is possible that not all data files will be known by file system, especially for user application data. Accordingly, the file system 702 can employ an adaptive algorithm 708 that monitors the frequency of writes to the data for effective implementation of this schema. In case the optimized memory is full, the data can be overflowed to regular memory space. Since the amount of data overflowed would be small, by design, the overflow will not impact the overall performance of the SSD for the OS.

Figure 8:
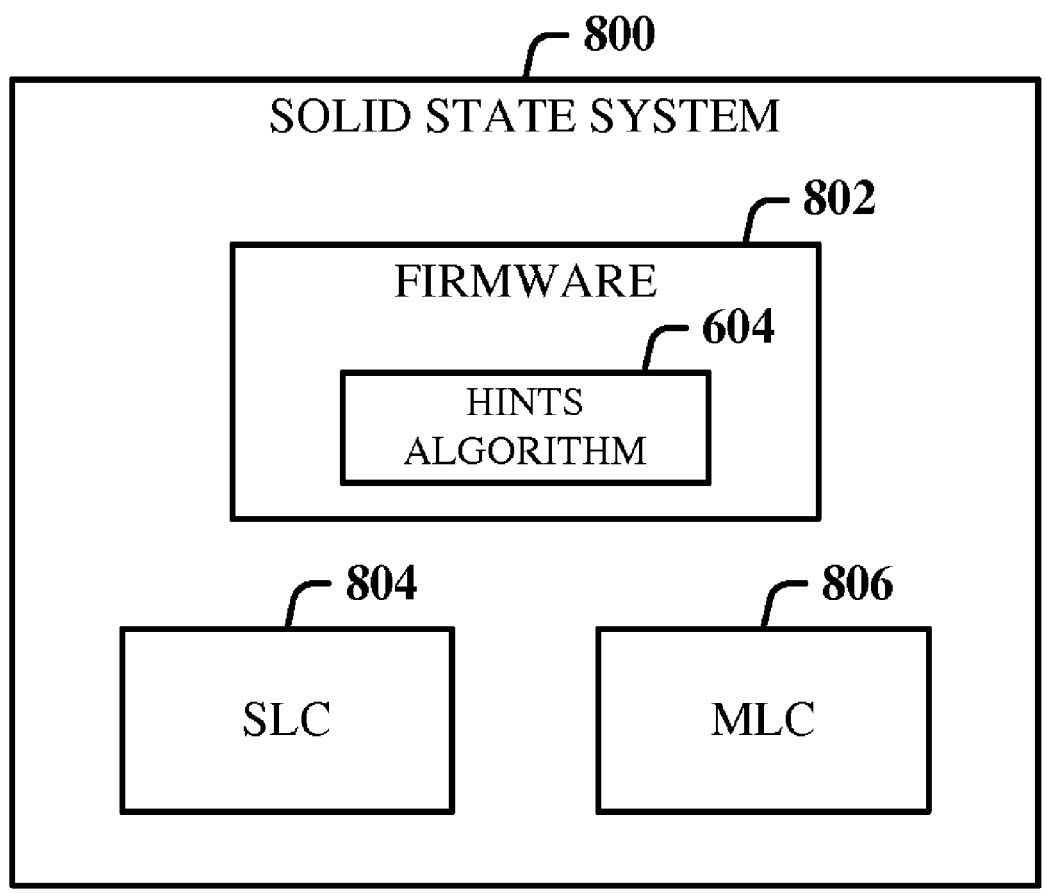
FIG. 8 illustrates a storage system for optimized data storage.

FIG. 8 illustrates a storage system 800 for optimized data storage. The system 800 can include an SSD, for example, which utilizes flash memory. The system 800 can include firmware 802 that stores one or more software algorithms (e.g., optionally, the hints algorithm 604) for managing data on the storage system 800. In one dual-memory implementation, the system 800 includes faster SLC flash memory 804 and slower MLC flash memory 806 for utilization as described above. The firmware 802 reports the addresses of the SLC memory 804 and the MLC memory 806 to the OS file system for storing more frequently-modified data in the SLC memory 804 and less-frequently-modified data in the MLC memory 806.

Where there are multiple (or first and second) systems 800 in the host storage system, data storage for more frequently-modified data can be in the SLC memory 804 across the multiple drives, provided sufficient space is available in the memory 804. Moreover, overflow data of SLC memory of a first system can be stored in the SLC memory of the second system.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
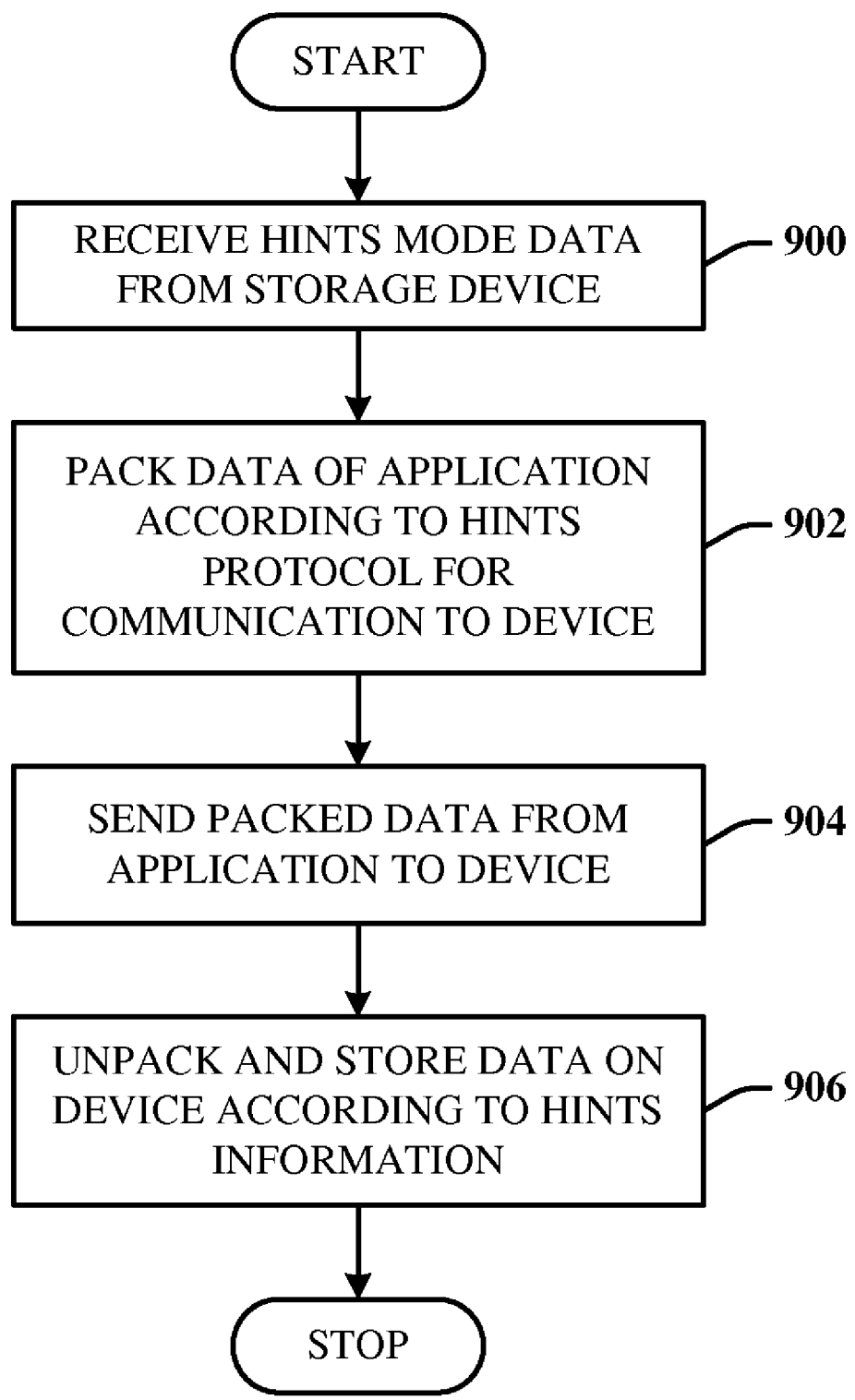
FIG. 9 illustrates a method of managing data storage.

FIG. 9 illustrates a method of managing data storage. At 900, hints mode data is received from a data storage device. The hints mode data indicates to an application (e.g., the OS) that the device can operate according to a hints protocol for optimized communications and data handling. At 902, the application packs the data according to the hints protocol for communication to the device. At 904, the packed data is sent form the application to the device. At 906, the device includes a hints algorithm that unpacks the data and stores the data according to hints information.

Figure 10:
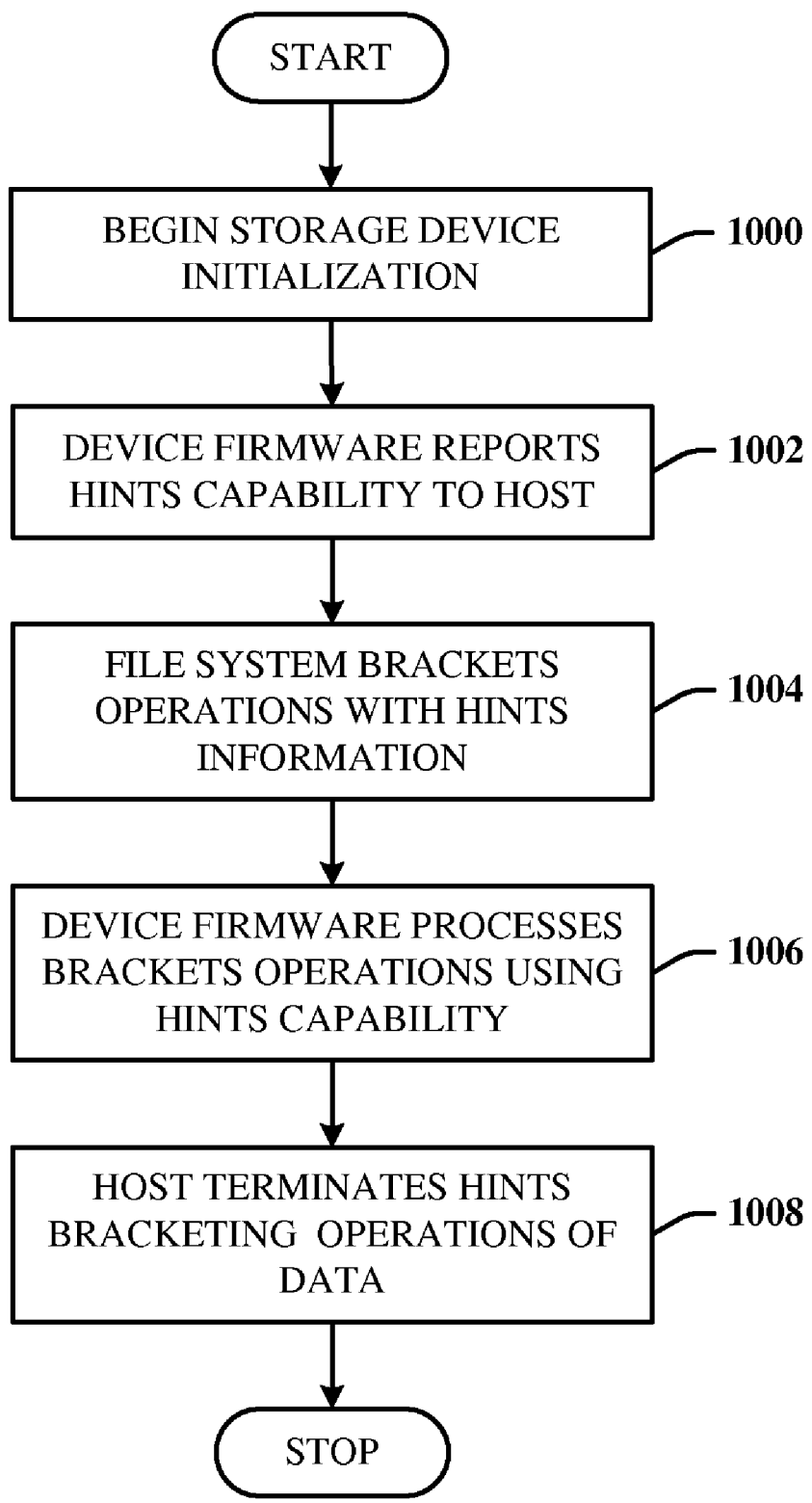
FIG. 10 illustrates a method of packaging hints-based data for transfer.

FIG. 10 illustrates a method of packaging hints-based data for transfer. At 1000, initialization of the storage device begins. At 1002, the storage device reports to the host OS that the device includes hints capability. At 1004, the host file system includes a driver that brackets data with hints information. At 1006, the storage device processes the bracketed hints data for storage. At 1008, the host terminates hints bracketing operations of data when the data flow ceases.

In other words, when storage device is being initialized, the device firmware reports the device capability to interpret hints language of a certain version. If the given storage device is able to interpret the hints file system driver (or custom filter driver, layered over the file system), the host file system begins bracketing complex data operations with hints header/trailer information (e.g., "START HINT"/"END HINT") sequences, for example. Other techniques for identifying hints data includes tagging the data with a hints tag, for example.

It is to be appreciated that although the storage device may include hints capability, use of hints operations can be optional by the storage device. When the bracketed sequence starts it can be terminated by the host. The hints language represents an open grammar with hints that can be identified by a numeric code. The device firmware does not need to reply to hints operations from the host, although if initiated, the storage device can reject hints, if not valid.

Figure 11:
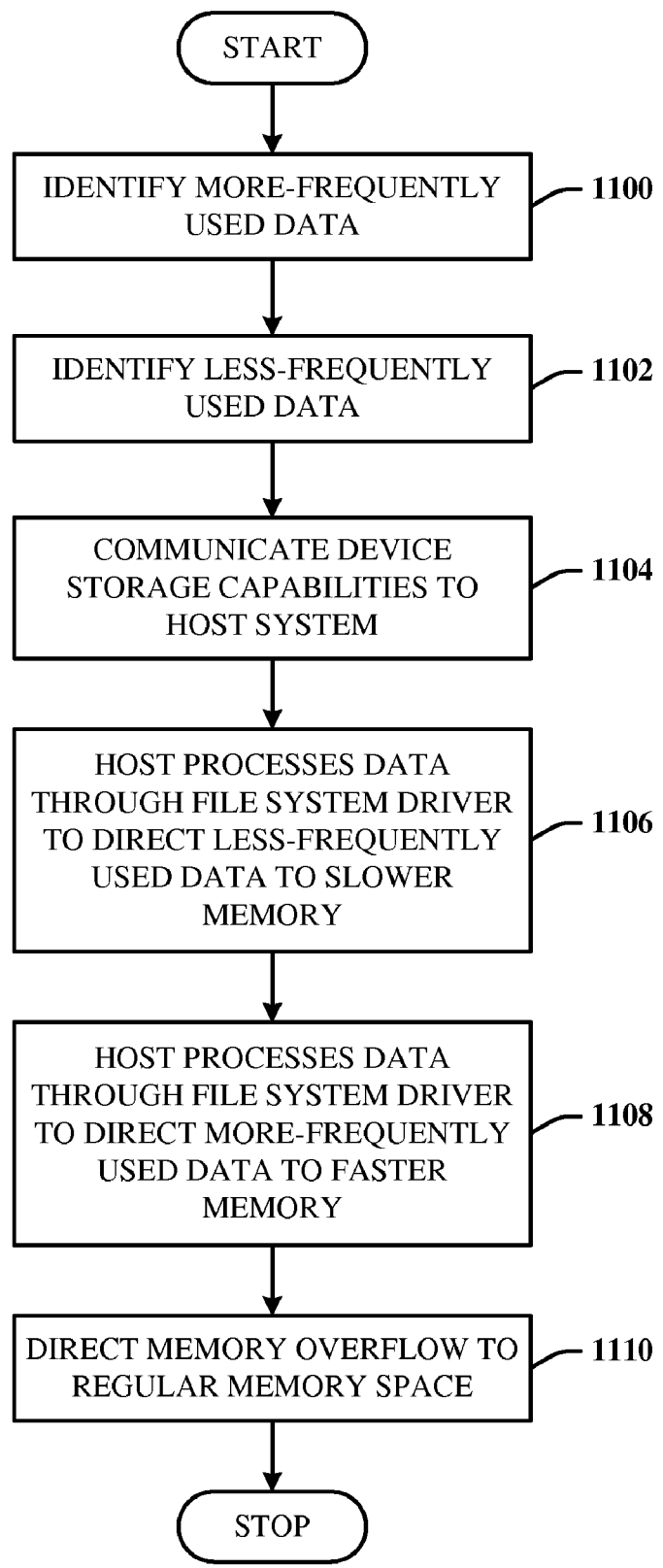
FIG. 11 illustrates a method of optimizing data utilization in a storage device.

FIG. 11 illustrates a method of optimizing data utilization in a storage device. At 1100, storage device capabilities are communicated to the host. At 1102, data is stored on the storage device. At 1104, more-frequently modified data is identified. At 1106, less-frequently modified data is identified. At 1108, the host processes hints data through a file system driver for directing more-frequently used data to a faster portion of storage device memory. At 1110, the host processes hints data through a file system driver for directing less-frequently used data to the slower portion of device memory. At 1110, overflow of the faster memory and/or the slower memory is directed to regular memory space.

Hints information can be related to whether the data forthcoming from the host is compressed, textual, video, audio, streaming, etc. Thus, the data need not be based on blocks, but on metadata that exposes the data as a file, the file size, and so on. Additionally, the hint can include information as whether the data should be processed dynamically or cached temporarily in the host for large block data handling (or batch storage) to the storage subsystem.

Moreover, it is can be commonplace to have multiple drives where hints information received from the multiple drives can be processed in the aggregate by the host to decide how to format the data for storage handling for all or some of the storage devices. In a large implementation of such SSD storage systems, it also becomes possible to power down (or sleep, standby) some drives based on hints information and the available faster/slower memory of the multi-drive system.

The SSD storage subsystem applies to ATA (advanced technology attachment, e.g., serial, parallel, etc.), a standard interface for connecting storage devices, and IDE (integrate drive electronics) technologies, as well as PCI (peripheral component interface), PCIe (PCI express), SCSI (small computer system interface), and other similar storage device interface technologies.

Figure 12:
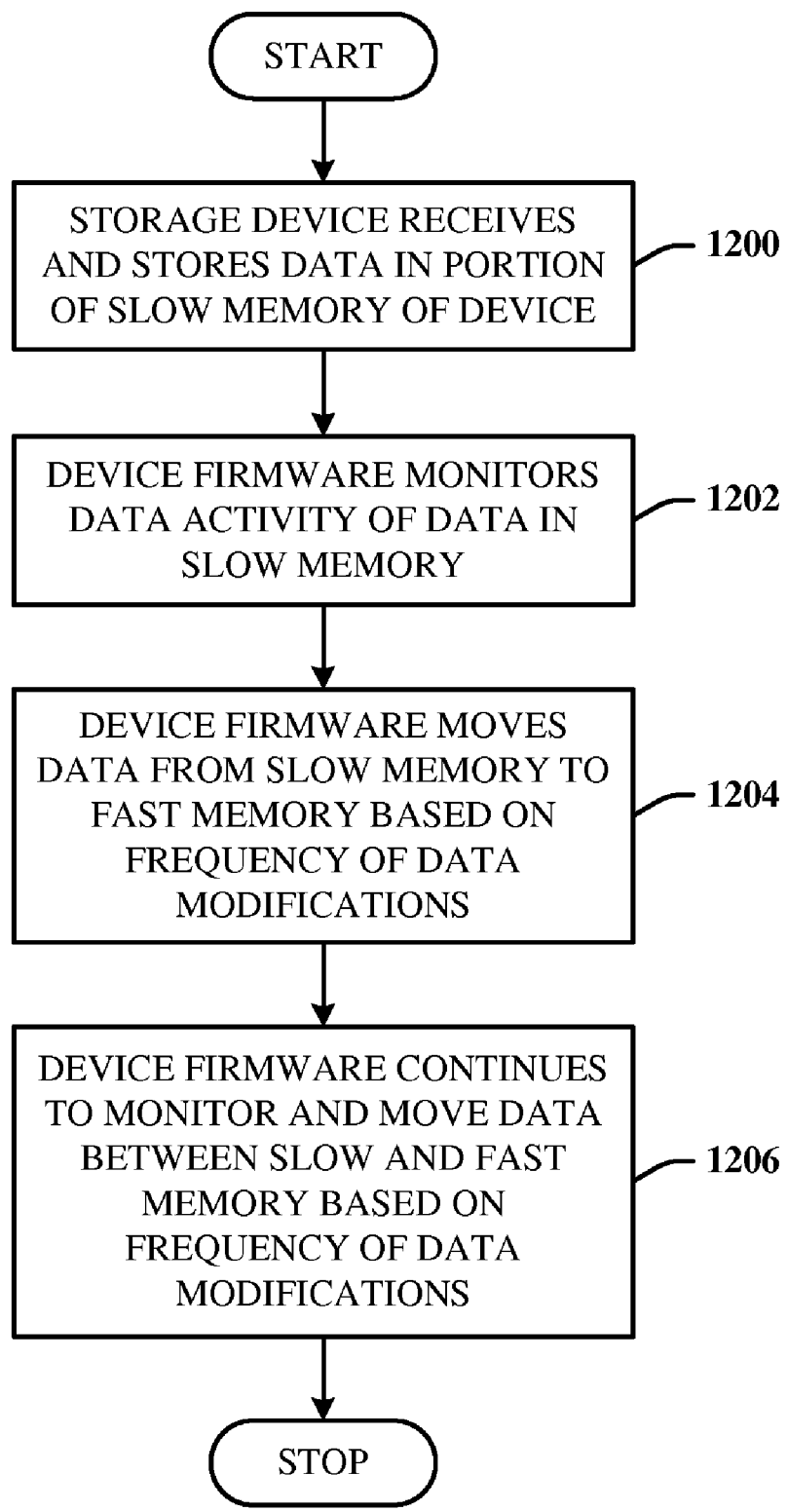
FIG. 12 illustrates a method of managing data storage on a solid state device based on the frequency of data modification.

FIG. 12 illustrates a method of managing data storage on a solid state device based on the frequency of data modification. At 1200, the device receives and stores data in a portion of slow memory of the device. At 1202, device firmware monitors data activity of the data in slow memory. At 1204, device firmware moves the data from slow memory to fast memory of the device based on the frequency of data modification of the data. At 1206, the device firmware monitors and moves data between the slow and fast memory based on the frequency of data modification of the data.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
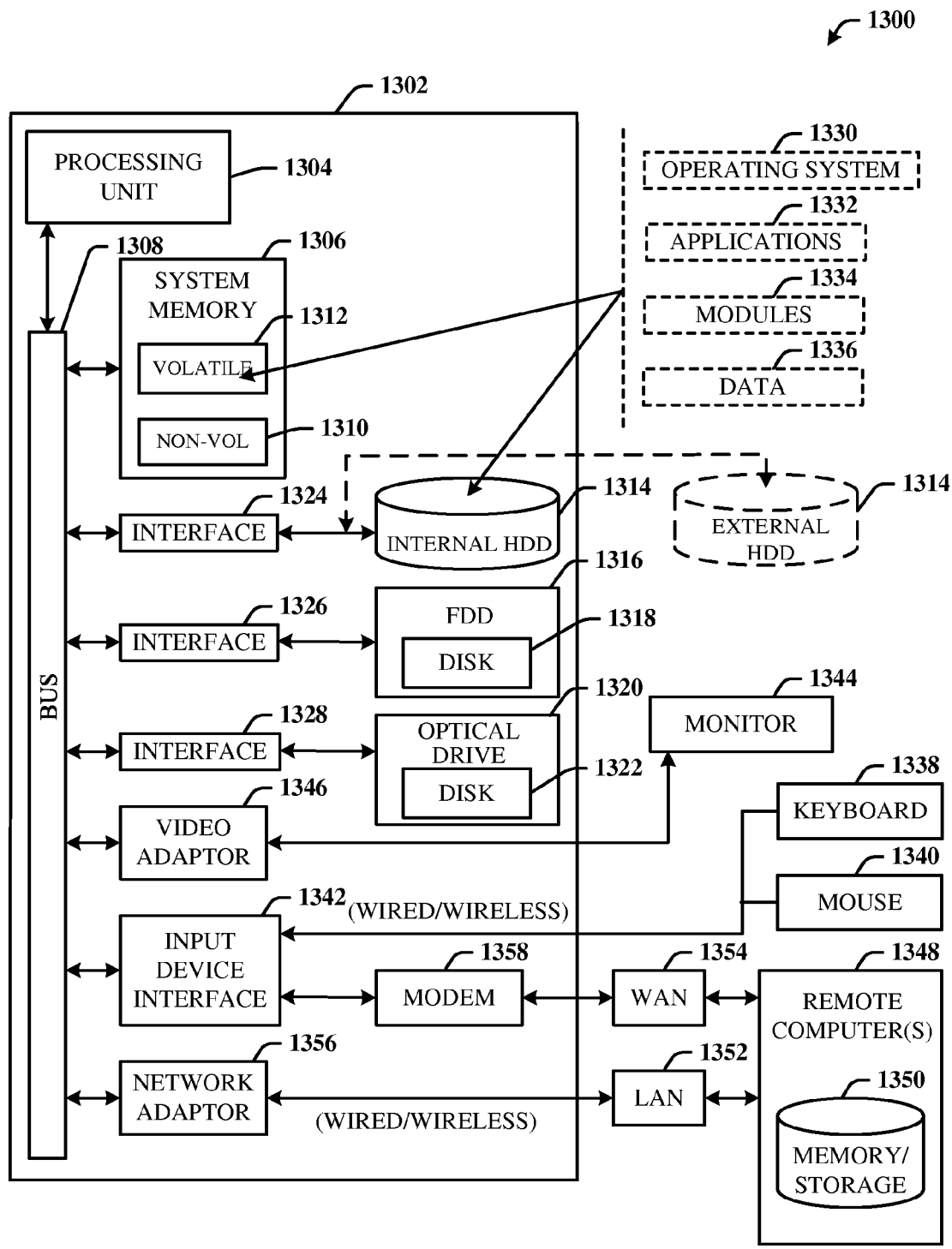
FIG. 13 illustrates a block diagram of a computing system operable to execute hints and write optimization in accordance with the disclosed architecture.

Referring now to FIG. 13, there is illustrated a block diagram of a computing system 1300 operable to execute hints and write optimization in accordance with the disclosed architecture. In order to provide additional context for various aspects thereof, FIG. 13 and the following discussion are intended to provide a brief, general description of a suitable computing system 1300 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302 having a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 can include non-volatile memory (NON-VOL) 1310 and/or volatile memory 1312 (e.g., random access memory (RAM)). A basic input/output system (BIOS) can be stored in the non-volatile memory 1310 (e.g., ROM, EPROM, EEPROM, etc.), which BIOS contains the basic routines that help to transfer information between elements within the computer 1302, such as during start-up. The volatile memory 1312 can also include a high-speed RAM such as static RAM for caching data.

The computer 1302 further includes an internal hard disk drive (HDD) 1314 (e.g., EIDE, SATA), which internal HDD 1314 may also be configured for external use in a suitable chassis, a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as a DVD). The HDD 1314 can be replaced with a solid state drive of flash memory that benefits from the disclosed hints and optimization architecture. As a SSD, the drive 1314 includes firmware (not shown) which further can include the hints algorithm 604.

The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1312, including an operating system 1330, one or more application programs 1332, other program modules 1334 and program data 1336. The operating system 1330 can employ the hints component 110 for hints protocol communications with suitable storage devices (e.g., drive 1334). The applications 1332 can also include modules for interfacing to the hints component 110 and providing data packing for hints communication to the storages devices.

All or portions of the operating system, applications, modules, and/or data can also be cached in the volatile memory 1312. It is to be appreciated that the disclosed architecture can be implemented with various commercially available operating systems or combinations of operating systems.

A user can enter commands and information into the computer 1302 through one or more wire/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wire and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 14:
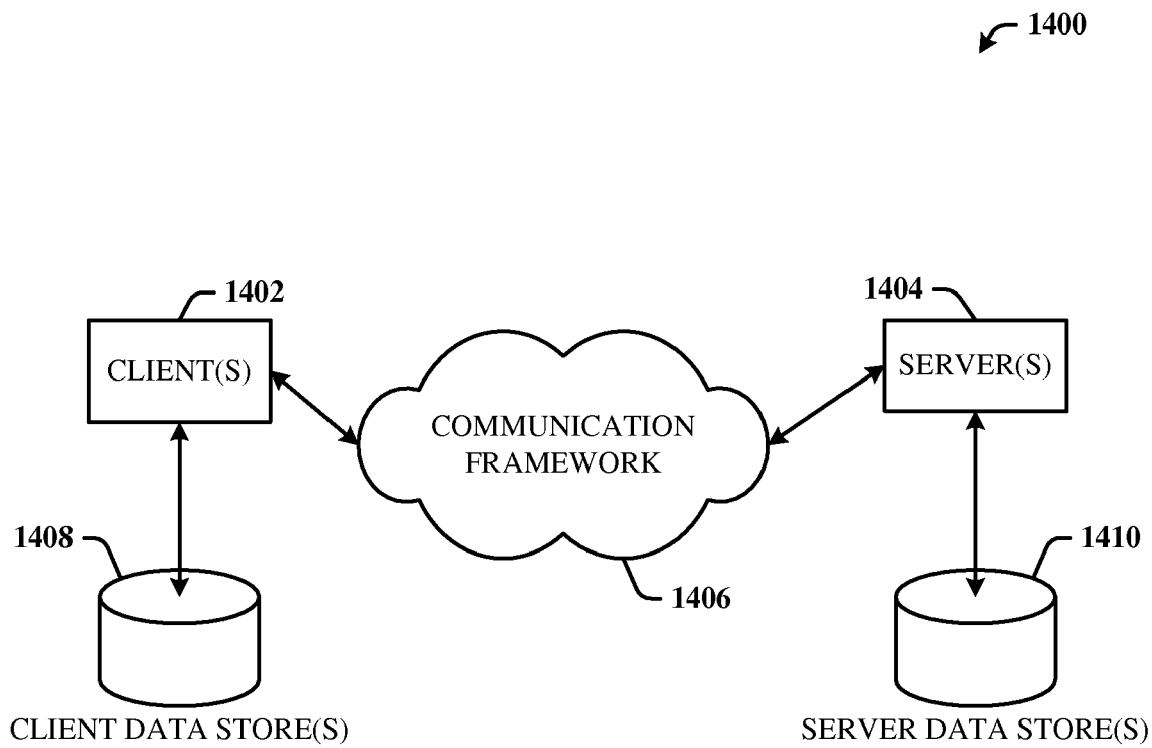
FIG. 14 illustrates a schematic block diagram of an exemplary computing environment for hints and write optimization processing.

Referring now to FIG. 14, there is illustrated a schematic block diagram of an exemplary computing environment 1400 for hints and write optimization processing. The system 1400 includes one or more client(s) 1402. The client(s) 1402 can be hardware and/or software (e.g., threads, processes, computing devices). The client(s) 1402 can house cookie(s) and/or associated contextual information, for example.

The system 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The clients 1402 can include hints-capable applications that communicate with hints-capable data stores 1410 of the servers 1404. In this particular implementation, the server operating system, for example, can filter (e.g., duplicates) and prioritize hints protocol writes, for example, to the server data stores 1410.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented memory management system, comprising:
   a data storage subsystem of a host system for storing data, the subsystem reporting operational capabilities of a subsystem operating mode for handling the data to the host system; and
   a hints component that employs a hints protocol for communicating operational hints to the subsystem from the host system, to facilitate a formal communications pipe for the data between a software layer of the host system to the subsystem based on the operating mode, to improve data operations between the host system and the subsystem.

2. The system of claim 1, wherein the hints protocol applies to communications of data blocks in at least one of the host system or to network connected block storage devices, and tags a series of block exchanges for communication.

3. The system of claim 1, wherein the data storage subsystem includes a hints algorithm in subsystem firmware as part of the hints component for optimizing data handling in the subsystem.

4. The system of claim 1, wherein the subsystem includes a solid state device for storing the data according to block writes.

5. The system of claim 1, wherein the hints protocol includes block range information that defines a set of blocks desired to be accessed, and in response to receiving, the subsystem stores the set of block in a contiguous manner.

6. The system of claim 1, wherein the subsystem includes sets of solid state memory each operating at a different speed, the subsystem stores frequently-accessed data in a faster solid state memory.

7. The system of claim 6, wherein the hints component signals the subsystem to store a block of the data in a specific set of the sets of solid state memory.

8. The system of claim 1, wherein the host system employs an adaptive algorithm for monitoring write activity of data stored in the subsystem, which subsystem includes a solid state drive, such that frequently-modified data is stored in the solid state drive.

9. The system of claim 8, wherein the solid state drive includes fast memory and slow memory such that the frequently-modified data is stored in the fast memory and less-frequently-modified data is stored in the slow memory.

10. The system of claim 1, wherein the hints protocol includes data maintenance information that defines memory locations that the subsystem should write to before reading.

11. The system of claim 1, wherein the hints protocol includes frequency information that defines if the data will be updated frequently or infrequently based on predetermined criteria.

12. The system of claim 1, wherein the hints protocol includes latency information which defines urgency in which the data is desired to be accessed relative to other data being accessed.

13. The system of claim 1, wherein the hints protocol includes allocation information which defines an intended delivery of data to the subsystem, in response to which the subsystem prepares memory locations for the data delivery.

14. The system of claim 1, wherein the software layer is an operating system, supporting one or more input/output filters for prioritizing or filtering hints information received from higher-level applications before sending the hints information to the subsystem.

15. A computer-implemented method of managing memory, comprising acts of:
receiving hints mode data from a storage device of a host related to an operating mode for handling data blocks, the hints mode data indicating to an application that the device can operate according to a hints protocol for optimized communications and data handling;
packing data of the application according to the hints protocol for communication to the device;
sending the packed data from the application to the device; and
storing the data on the device according to the hints mode data.

16. The method of claim 15, wherein the application is one of a host operating system, a host application, or an application of a remote system.

17. The method of claim 15, further comprising:
packing the data as a sequence of data blocks for block communications and storage on the device; and
allocating and de-allocating memory locations based on the hints mode data.

18. The method of claim 15, further comprising moving data between fast memory and slow memory in the device based on frequency of modifications to the data.

19. The method of claim 15, wherein the packed data is communicated in a sequence of block writes to contiguous memory locations in the device.

20. A computer-implemented system, comprising:
computer-implemented means for receiving hints mode data from a storage device of a host related to an operating mode for handling data blocks, the hints mode data indicating to an application that the device can operate according to a hints protocol for optimized communications and data handling;
computer-implemented means for packing data of an application according to a hints protocol for communication to the device;
computer-implemented means for sending the packed data from the application to the device; and
computer-implemented means for storing the data on the device according to the hints mode data.

* * * * *